United States Patent [19]
Alsup et al.

[11] Patent Number: 5,694,564
[45] Date of Patent: *Dec. 2, 1997

[54] DATA PROCESSING SYSTEM A METHOD FOR PERFORMING REGISTER RENAMING HAVING BACK-UP CAPABILITY

[75] Inventors: Mitchell Alsup; Michael C. Becker, both of Austin, Tex.

[73] Assignee: Motorola, Inc., Schaumburg, Ill.

[*] Notice: The terminal 25 months of this patent has been disclaimed.

[21] Appl. No.: 338

[22] Filed: Jan. 4, 1993

[51] Int. Cl.⁶ .......................... G06F 12/00; G06F 12/02; G06F 12/08
[52] U.S. Cl. ...................... 395/375; 364/DIG. 1; 364/245; 364/246.3; 364/247; 364/247.6
[58] Field of Search .................. 364/DIG. 1 MS File, 364/DIG. 2 MS File; 395/375, 800

[56] References Cited

U.S. PATENT DOCUMENTS

| | | | |
|---|---|---|---|
| 4,725,873 | 2/1988 | Shonai et al. | 395/800 |
| 4,725,947 | 2/1988 | Shonai et al. | 395/375 |
| 4,794,518 | 12/1988 | Mizushima | 395/775 |
| 4,901,233 | 2/1990 | Liptay | 395/375 |
| 5,226,164 | 7/1993 | Nadus et al. | 395/800 |

OTHER PUBLICATIONS

G. F. Grohoski Research and Development, vol. 34, No. 1, Jan. 1990, pp. 47–54.

*Primary Examiner*—Robert B. Harrell
*Attorney, Agent, or Firm*—Charlotte B. Whitaker

[57] ABSTRACT

In a data processing system, a method for performing register renaming with back-up capability. A register renaming apparatus (18) comprises a logical-physical (LP) register map (30), a free list (32), and an internal swap bus (90) for exchanging information between the two. The register renaming hardware (18) is connected to an instruction sequencer (12) and instruction decode/issue logic (16). Each time the decode/issue logic (16) decodes an instruction(s), the logical registers to be read index the LP map (30) to find the physical register "name" where their values can be found. The free list 32 is indexed by instruction slot numbers. Each free list cell (60–75) contains two physical register names a "last" and a "current", as well as pointer (80–83) designating which name is "current". As each write is done the "current" name is transferred to the LP map 30, and the previous physical register name in the LP map (30) is installed in the free list (32) in the place of the "last" name. The pointer (80) is then toggled so that the "last" becomes "current".

16 Claims, 11 Drawing Sheets

DATA PROCESSING SYSTEM A METHOD FOR PERFORMING REGISTER RENAMING HAVING BACK-UP CAPABILITY

FIELD OF THE INVENTION

This invention relates generally to data processors, and more particularly data processors using register renaming.

BACKGROUND OF THE INVENTION

Data processors which speculatively execute instructions (e.g. branch) must have a mechanism to restore the state of the data processor when the data processor fails to complete execution of a "speculative" instruction, such as in the case of an incorrect branch prediction. Typically, these data processor relax the execution order from the strict "in order" semantics seen by the "architectural" execution stream, thereby improving the data processor's overall performance by allowing the dynamic rearranging of instructions. A branch prediction mistake or instruction exceptions may cause the instruction execution order performed by the data processor to differ from the semantics demanded by the architectural processor model. In such case, the data processor has a need to perform a "back-up" operation to an instruction issuance point at or before the occurrence of the branch prediction mistake or exception condition, as if the instruction which issued as a result of the branch misprediction never occurred. Thus, the data processor requires a mechanism to perform a rapid back-up operation to restore the proper architectural order when a great number of predictions and/or exceptions can occur.

Known high performance data processors typically handle high speed data storage through the use of physical registers, whereby a program specifies a designated physical register where a required data operand is stored. Generally, the instruction encoding limits the number of physical registers available to the program. For example, with a 32-bit encoding capability that provides for two source and one destination physical register, the maximum number of physical registers is 32 (where each encoded field uses five bits of instruction encoding). In heavily pipelined computer architectures, where the lifetime of the data storage in a register is long, many programs could benefit from the availability of more physical registers. One mechanism employed by data processing systems for providing more physical (hardware) registers while preserving the instruction encoding is register renaming. The renaming mechanism works by mapping an original logical (program) register number found in the encoded field of the instruction into a pool of physical registers. The logical registers are those which the program manipulates during instruction execution. The pool of physical registers is generally larger (i.e. greater in number) than the number of architected registers. At system reset, each logical register of the instruction set architecture being emulated by the data processing system is assigned a physical register to represent it. Currently unassigned physical registers are maintained in a free list.

The register assignment is determined by the program. Initially, all logical registers are mapped to a unique physical register number by a renaming mechanism. Each time the program specifies a program (logical) register value change, the renaming mechanism finds a new physical register ("renamed" register) from a pool of available physical registers to map to such program register. Every read to the changed program register uses the new "renamed" register. Thus, at any given time, a particular logical register may be remapped to one or more rename (physical) registers; however, at any given time only one physical register mapping is the most recent mapping for such logical register. The ability to "back-up" the data processing system to an earlier mapping is required to allow speculative execution of instructions which are beyond branches. Accordingly, whenever a back-up of the data processing system is required, the old register mappings must be reinstated. Furthermore, in high performance data processing systems capable of issuing multiple instructions each clock cycle, the register renaming mechanism must support the multiple instruction issue hardware. It is, therefore, desirable that the register renaming mechanism simultaneously support both register mapping for multiple instructions, as well as the capability to back-up multiple instructions.

SUMMARY OF THE INVENTION

In a data processing system, a method for performing register renaming having back-up capability is provided. The data processing system has instruction sequencing and issuance logic for controlling the decoding and issuance of packets of instructions to a predetermined number of execution units. A register renaming mechanism is coupled to the instruction sequencing and issuance logic and the execution units. The register renaming mechanism comprises a logical to physical (LP) register map and a free list, for mapping a predetermined number of logical register to a predetermined set of physical registers upon issuance by the instruction sending means of each packet of instructions.

The register renaming mechanism initializes the LP register map by storing a unique physical register name in each of a first set of register map cells in the LP register map, and each of a first set of free cells in the free list, and sensing a bit in a control latch coupled to each of the free cells to a first logic value.

In response to the instruction sending and issuance logic decoding a first instruction packet at a first instruction issuance checkpoint, the register, renaming mechanism exchanges each unique physical register name in a first group of destination registers, stored in the first set of register map cells, with an allocated physical register name from a first latch in a selected number of free cells, and toggles the bit in the control latch coupled to each of the selected number of free cells. The register rename mechanism simultaneously copies each unique physical register name in a first group of source registers, stored in the first set of register map cells, from the first set of register map cells into a second set of register map cells.

After a next packet of instructions is decoded by the instruction sequencing and issuance logic at a second instruction issuance checkpoint, the register rename mechanism updates each of the free cells with a new group of destination register names by exchanging the new group of destination register names with a newly allocated physical register name from a first latch in each of a newly selected number of free cells, and toggles the bit in the control latch coupled to each of the newly selected number of free cell.

When the instruction sequencing and issuance logic needs to perform a back-up operation, the register rename mechanism restores the LP register map to a previous instruction issuance checkpoint, designated by the instruction sequencing and issuance logic, by examining a logic state of the control bit of the free cells at a current instruction issuance checkpoint, and searching for a first one of the control bits for the free cells, at the instruction issuance checkpoints issued between the previous instruction issuance checkpoint designated by the instruction sequencing and issuance logic and the current checkpoint, having a complementary logic state, and toggling each of the control bits between the current instruction issuance checkpoint and the designated instruction issuance checkpoint.

DESCRIPTION OF A PREFERRED EMBODIMENT OF THE INVENTION

Figure 1:
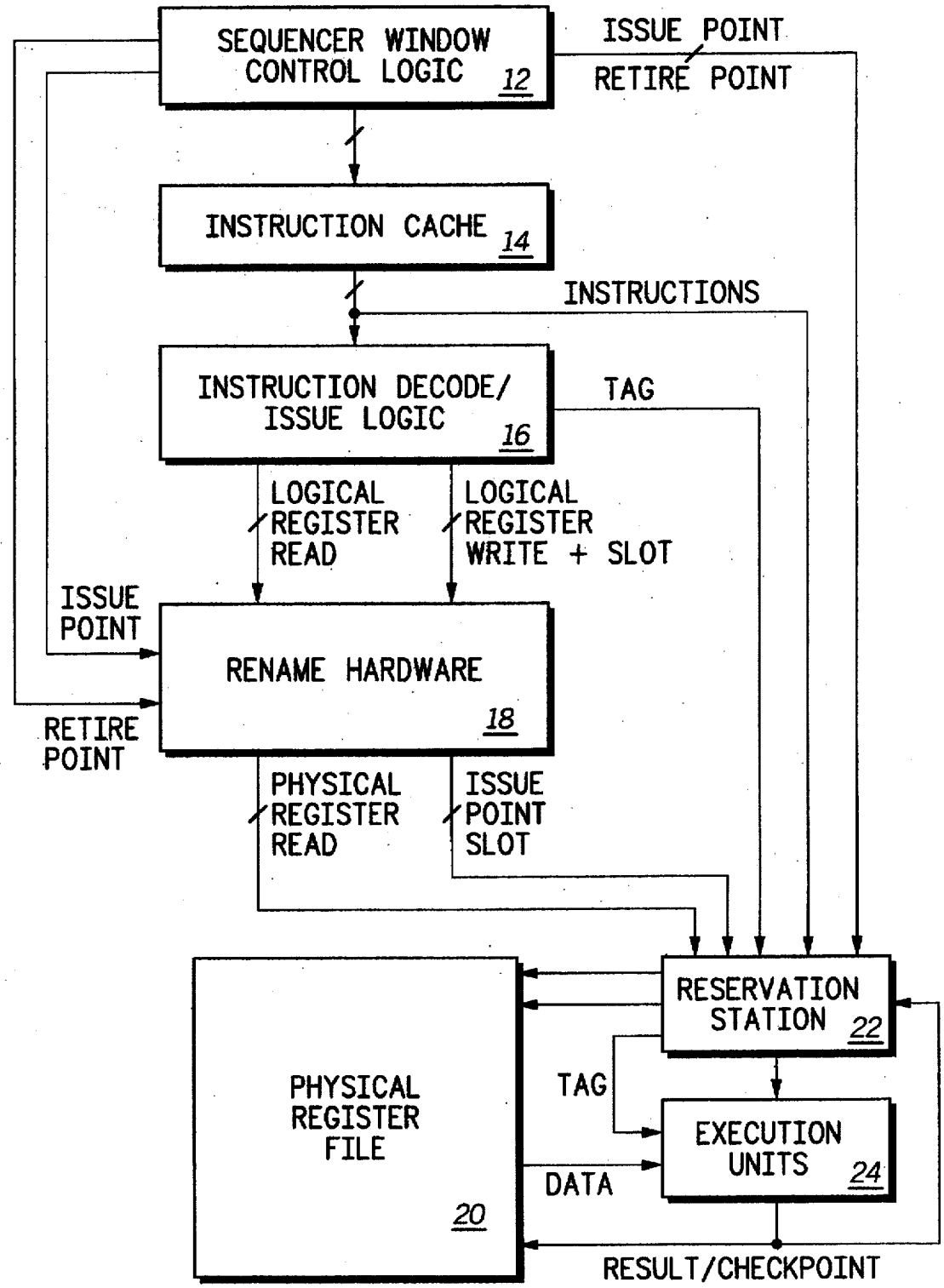
FIG. 1 illustrates in block diagram form a data processing system having a register renaming mechanism with back-up capability, in accordance with a preferred embodiment of the present invention.

The present invention may be implemented in a variety of computer system environments. Accordingly, the data processing system 10 of FIG. 1 is provided for illustrative purposes only, and is not intended to limit the scope of the invention. Illustrated in FIG. 1 is a data processing system 10 for performing register renaming in accordance with a preferred embodiment of the present invention. In operation, sequencer window control logic circuitry 12 selects a group ("packet") of instructions for execution, and provides the instruction address for the selected instructions to an instruction cache 14. The instruction cache 14 locates the requested instruction(s) and delivers the instruction or packet of instructions to the instruction decode/issue logic 16. The register rename hardware 18 maps the incoming logical register names (for each instruction to be executed) into physical register names and builds a new entry in a mapping table for the next issue cycle. The physical register names are indexes into a physical register file 20. Pending instruction execution by the execution units 24, the data values stored in the mapped physical registers for each instruction in a packet are stored in reservations stations 22. The reservation stations 22 receive CONTROL information from the sequencer 12 indicating the Issue point, and Retire point. Furthermore, the reservation stations 22 maintain instruction slot and window control information.

Simultaneous to the mapping process, the instruction decode/issue logic 16 examines each instruction to determine whether each instruction will deliver a value. When the instruction will deliver a value, a register map in the rename hardware 18 is updated, in accordance with present invention. The logical register names (for writes) sent by the instruction decode/issue logic 16 to the rename hardware 18 have a specific ordering ("slot information") to allow the rename hardware 18 to assign the physical register names to the instruction. Using the physical register name or some equivalent functionality (e.g. "TAG"), the physical register file 20 indicates to the execution units 24 the correct physical register in which to write the result. The sequencer 12 keeps track of each group of instructions ("PACKET") and sends to the rename hardware 18 and the reservation stations 22 an identifier ("issue point") for each packet of instructions. Furthermore, the sequencer 12 keeps track of the each instruction packet and indicates to the rename hardware 18 and reservation stations 22 which packet or group of packets may be retired ("retire checkpoint") due to the completion of instruction execution by one of the execution units 24.

Figure 2:
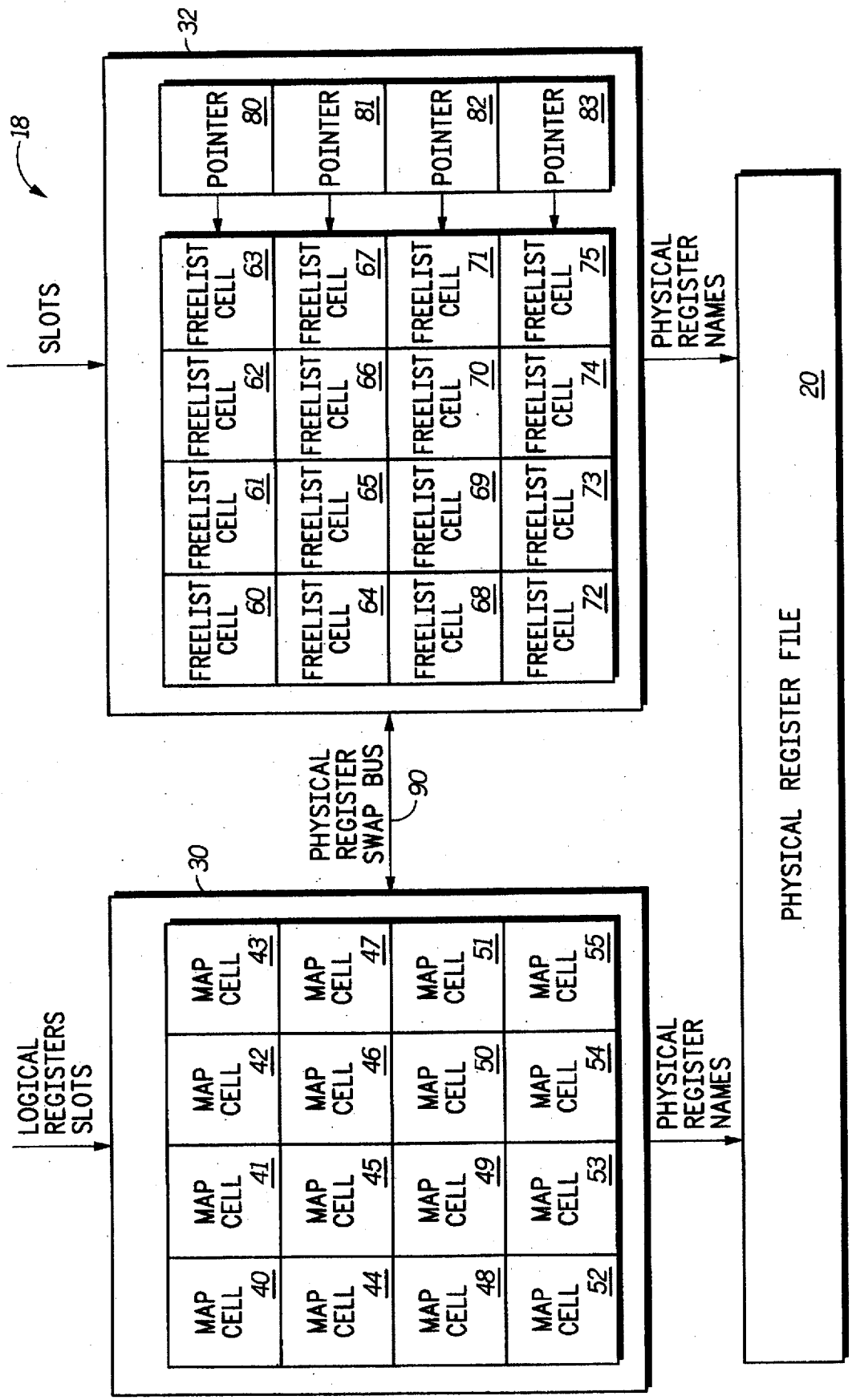
FIG. 2 illustrates in block diagram form the register renaming mechanism of FIG. 1, having register mapping logic and free list logic for use in accordance with a preferred embodiment of the present invention.

As illustrated in FIG. 2, the register rename hardware 18 comprises a logical-physical (LP) map 30, a free list 32, and a physical register swap bus 90 which provides the means for exchanging physical registers names between the LP map 30, and the free list 32. In an embodiment illustrated in FIG. 2, the LP map 30 comprises a matrix of map cells 40–55, having M rows and X columns, where M is an integer equal to the number of logical registers in the architectural model of the data processing system 10, and X is an integer equal to the number of issue points. The free list 32 comprises a matrix of free list cells 60–75, having N rows of pointers 80–83, and X columns, where N is the number of instruction issue slots, and and X is the number of issue points. The LP map 30 and the free list 32, illustrated in FIG. 2, are arranged as 4×4 matrices. Accordingly, the LP map 30 comprises sixteen map cells 40–55 for mapping four logical registers R0–R3, and the free list 32 comprises sixteen free list cells 60–75 for storing free physical registers for each of four instruction slots.

Each time an instruction (or group of instructions) is decoded by the instruction decode/issue logic 16, the logical registers which will be read index the logical to physical (LP) map 30, in the rename hardware 18, to find the physical register "name" where their values can be found. This "name" is forwarded to the reservation station 22. In accordance with the present invention, the logical registers that will be written to take a physical register name from a free list 32 and place that physical register name into the LP map 30, via a physical register swap bus 90. The LP map 30 now has a new register mapping stored in a map cell, for example map cell 40, that is part of an array of mappings in the LP map 30. Accordingly, the LP map 30 stores the different register mappings (logical-physical) that occur each time an instruction or group of instructions is decoded by the instruction decode/issue logic 16. The free list 32 stores in each of the free list cells 60–75 the available physical ("Idle") registers that can be reused by the data processing system 10. Idle registers are those physical registers which have no live entry in the LP map 30, and can therefore be selected for allocation (mapping). For each issue point, the free list 32 stores all of the currently free physical register names that can be written by the group of instructions decoded together. The free list 32 is indexed by instruction slot (SLOT) information which indicates the relative position of an instruction to other instructions decoded at the same time.

Illustrated in FIGS. 3–9 are examples of sequences of register renaming operations performed by the data processing system 10, in accordance with the present invention. In the example sequences, data processing system 10 has four logical registers (R0–R3), and four issue points, therefore, the issue width (IW) is four. In the present invention, the number of required physical registers (P) to perform the register renaming operation is determined by Eq. 1—1.

$$P = R * (IW + 1).$$ Eq. 1—1

Thus, in the example sequences illustrated in FIGS. 3–9, the number of physical registers required to support the register renaming operation is twenty.

Figure 3:
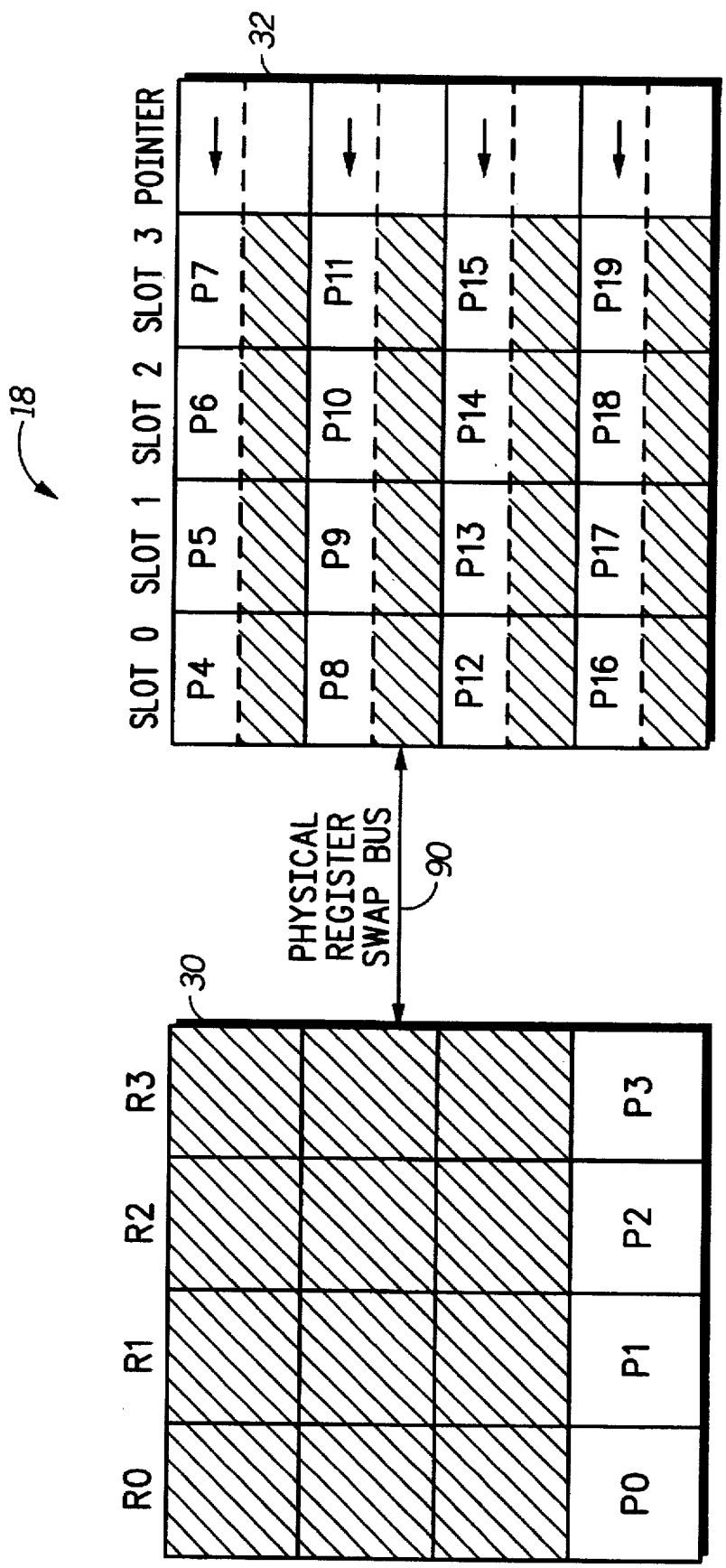
FIGS. 3, 4, 5, 6, 7, 8 and 9 illustrates example sequences of register renaming operations performed by the data processing system 10, in accordance with the present invention.

Illustrated in FIG. 3 is the register mapping which occurs during initialization (I0). During initialization, the physical registers P0–P3 are taken from the free list 32 and transferred, via the physical register swap bus 90, into the LP map 30. Thus, as illustrated, the logical registers R0–R3 are mapped to physical registers P0–P3, respectively, in the LP map 30. The cross-hatched areas indicate unmapped cells in the LP map 30 and free list cells 32. Thus, at initialization logical registesr R0–R3 are mapped to physical registers P0–P3, respectively, and physical register P4–P19 are stored in the free list 32. As a result of this initialization, physical registers P0–P3 become "Visible". Essentially, a Visible physical register is found in the LP map 30 at the location indexed by its corresponding logical register.

Figure 4:
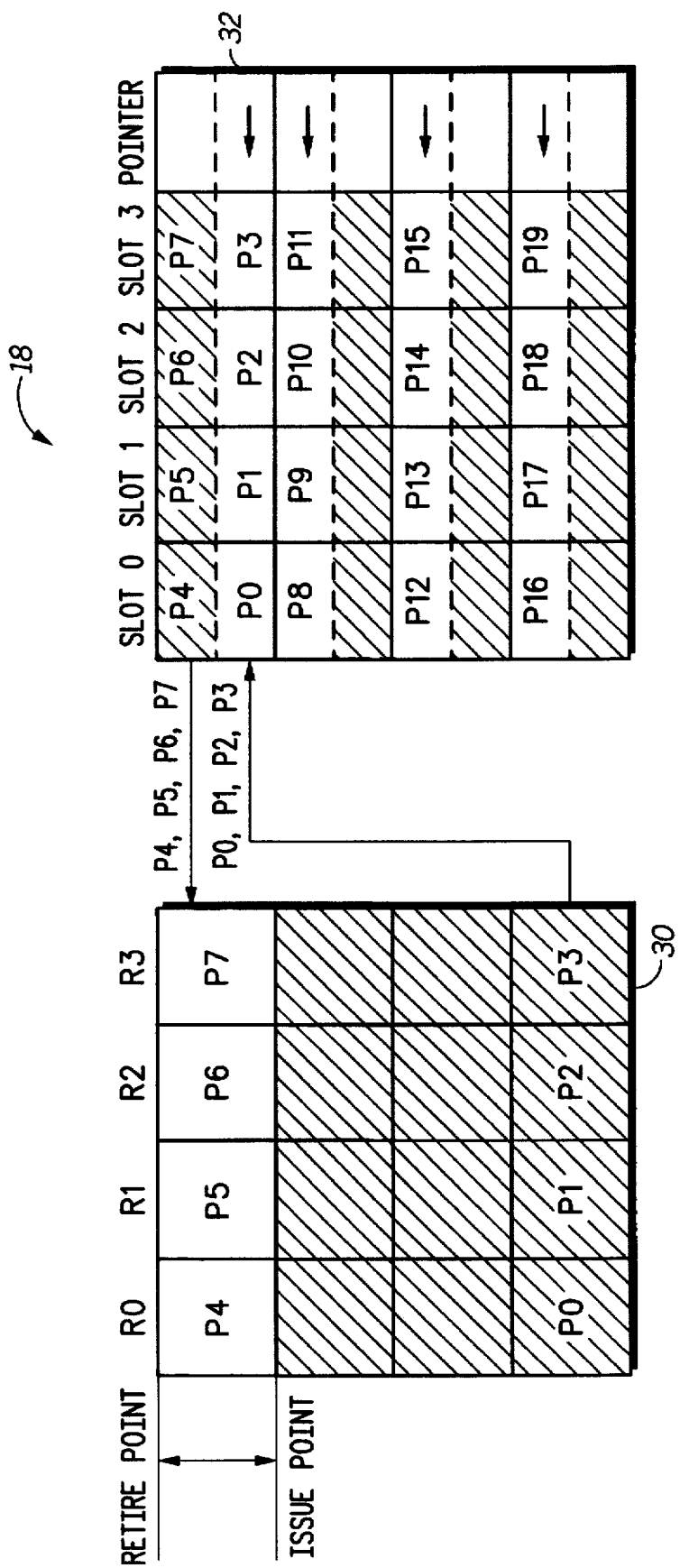

Illustrated in FIG. 4 is the first issue point (I1) in the register renaming sequence. At the first issue point, the instruction decode/issue logic 16 decodes a first instruction packet (PACKET1) which comprises four ADD instructions as shown in Table I below.

TABLE I

| SLOT0 | ADD (R1 + R2) –> R0 |
|---|---|
| SLOT1 | ADD (R1 + R2) –> R1 |
| SLOT2 | ADD (R1 + R2) –> R2 |
| SLOT3 | ADD (R1 + R2) –> R3 |

As previously indicated the free list 32 is indexed by instruction slots (SLOT0–3), therefore, the first ADD instruction is allocated to SLOT0, and the last ADD instruction is allocated to SLOT3. The destination logical register R0 is, therefore, mapped to physical register P4, since P4 is a free physical register in instruction SLOT0. Likewise, the destination logical register R1 is mapped to physical register P5, since P5 is the a free physical register in instruction SLOT1, and so on. The physical registers P4–P7 are taken from the free list 32 and placed in the map cells 104–107, respectively, of LP map 30 at the issue point I1. Thus, the register mapping for R0–R3 at the first issue point (I1) is P4–P7, respectively.

Figure 11:
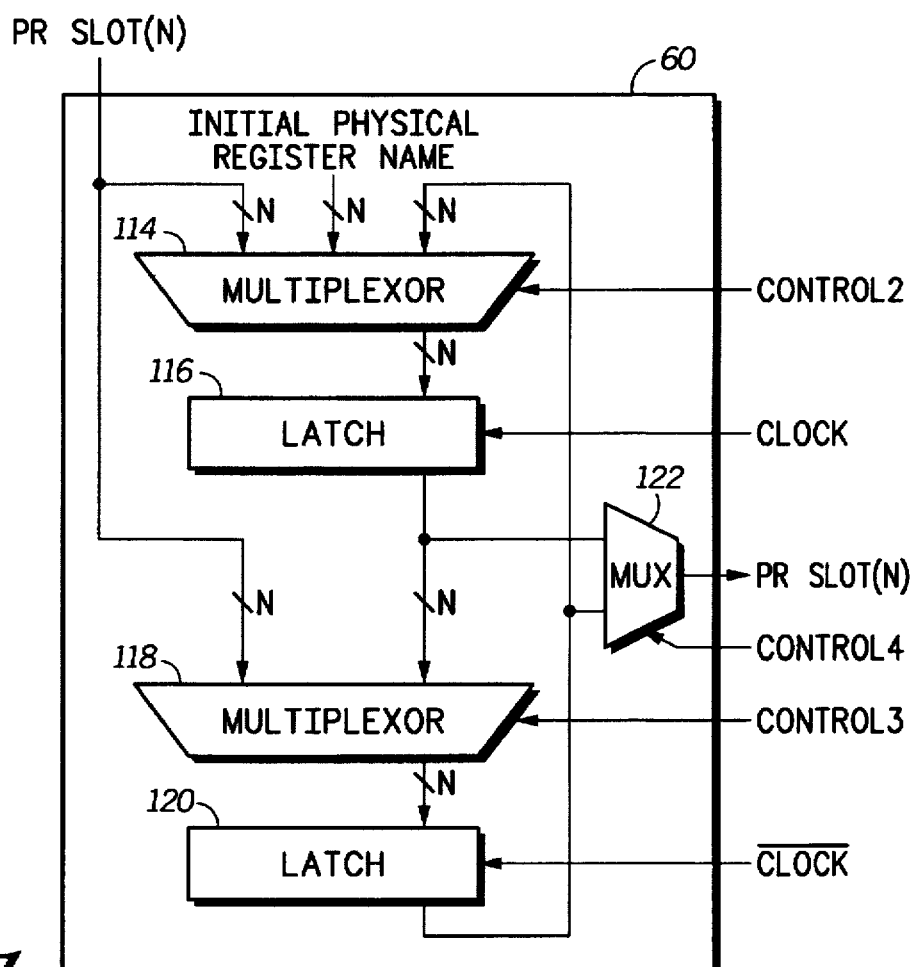
FIG. 11 illustrates in block diagram form a free list cell of the free list logic of FIG. 2, in accordance with the preferred embodiment of the present invention.

In accordance with the present invention, as illustrated in FIG. 11, each free list cell 60–79 contains two physical register names, a LAST and a CURRENT, as well as a pointer 80–83 (FIG. 2) designating which physical register name is CURRENT. As data processing system 10 performs each write operation, the CURRENT physical register name is transferred to the LP map 30 as described above, and the physical register name from the LP map 30 is installed in the free list 32 in the place of the LAST name. The pointer (e.g. pointer 80) is then toggled so that the LAST becomes CURRENT. Thus, as described above, physical register P4 is taken from the free list 32 and transferred to the LP map 30, via the swap bus 90. As a result, P4 is mapped to destination logical register R0, and becomes Visible. The physical register name (P0) previously mapped to R0 in the LP map 30 is stored in the first name latch 116 (FIG. 11) of the corresponding free list cell, and thereby becomes "Invisible". An Invisible register is one which has been overwritten in a logical sense, but may become visible if the sequencer 12 is required to perform a "back-up" operation due to a branch misprediction or exception. The pointer 80 (FIG. 2) is then toggled to designate the LAST (Invisible) physical register mapped (P0) as the CURRENT free physical register in the free list cell 60. Accordingly, since physical registers P0–P3 were previously mapped to R0–R3 at initialization, P0–P3 are stored in the first name latch 116 (FIG. 11) of free list cells 60–63, respectively, and the pointer 80 is toggled to point to the P0–P3 as the CURRENT free physical registers. Similarly, since physical registers P4–P7 are currently ("Visible") mapped to logical registers R0–R3, as a restrict of the issuance of the instructions in PACKET1, P4–P7 are stored in the LAST name latch 120 (FIG. 11) of free list cells 60–63, respectively, as indicated by the shading in FIG. 4.

Figure 5:
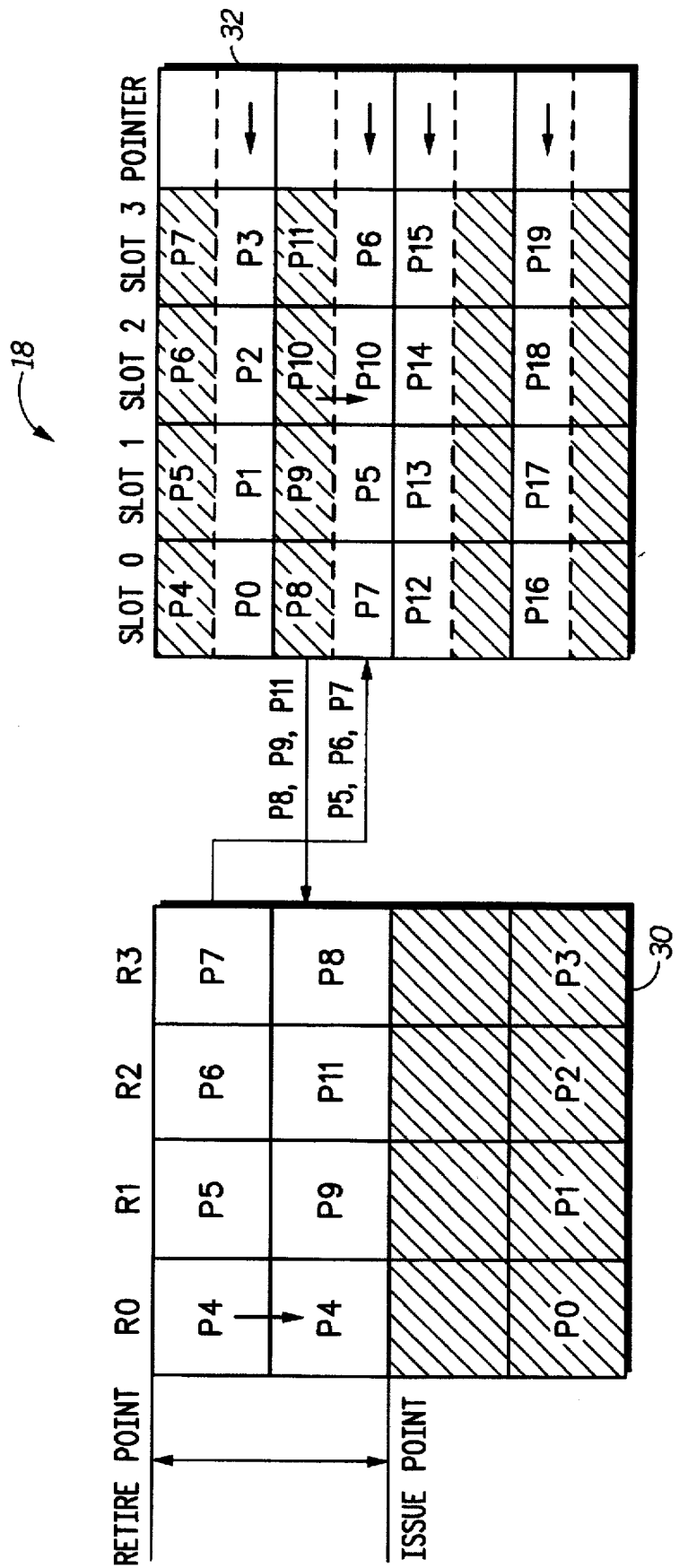

As illustrated in FIG. 5, at a second issue point (I2), the instruction decode/issue logic 16 decodes instruction PACKET2 which contains three ADD instructions as indicated in Table II

TABLE II

| SLOT0 | ADD (R1 + R2) –> R3 |
|---|---|
| SLOT1 | ADD (R3 + R2) –> R1 |
| SLOT2 | NOP |
| SLOT3 | ADD (R1 + R2) –> R2 |

As previously described, the free list 32 is indexed by instruction slots. Accordingly, the first ADD instruction is allocated to SLOT0, therefore, the destination logical register R3 is mapped to physical register P8, since P8 is the free physical register in instruction SLOT0 of the free list 32. Similarly, destination logical register R1 is mapped to physical register P9, since P9 is the free physical register in instruction SLOT1 of the free list 32. The NOP instruction decoded in SLOT2 does not affect the register mapping, therefore, the free physical register P10 is copied into the adjacent free list cell for SLOT2, as indicated by the arrows in FIG. 5. Similarly, since none of the instructions decoded in PACKET2 affected the mapping of logical register R0, the renaming hardware 18 copies the previous physical register mapping (P4) for R0 into the adjacent map cell, in LP map 30, as illustrated in FIG. 5. The last ADD instruction requires the destination logical register 1t2 to be renamed with the free physical register (P11) in SLOT3. Thus, the register mapping for R0–R3, at the second issue point is P4, P9, P11, P8, respectively, as illustrated in FIG. 5. The physical register names P5, P6, and P7 previously mapped in the LP map 30 are installed in the place of the LAST name in free list cells 64–67 (FIG. 2), and the pointer 81 is toggled so that the last becomes the current.

Figure 6:
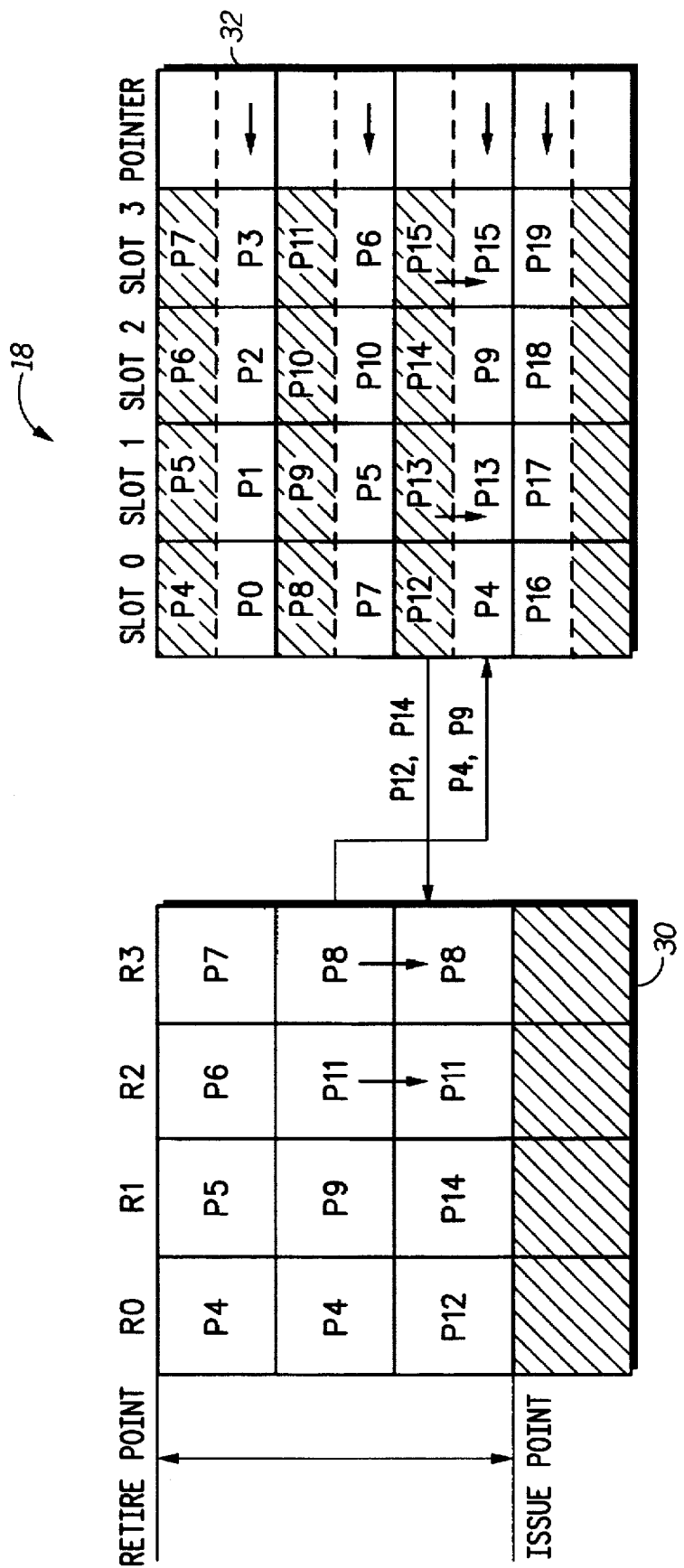

At a third issue point (I3) illustrated in FIG. 6, the instruction decode/issue logic 16 decodes instruction PACKET3 which comprises two ADD instructions, and hvo NOP instructions as indicated in Table III below.

TABLE III

| SLOT0 | ADD (R1 + R2) –> R0 |
|---|---|
| SLOT1 | NOP |
| SLOT2 | ADD (R1 + R2) –> R1 |
| SLOT3 | NOP |

The first ADD instruction, decoded in SLOT0, causes logical destination register R0 to be remapped to the free physical register, P12, in SLOT0. Whereas, the second ADD instruction causes register R1 to be remapped to the free physical register P14 in SLOT2. Since the instructions decoded in PACKET2 do not affect the mappings for logical registers R2 and R3, the physical registers P11 and P8, previously mapped to R2 and R3, respectively, are copied into the adjacent map cells, in the LP map 30, as indicated by the arrows. Similarly, the free physical registers from SLOT1 and SLOT3, which were not mapped, are copied into the adjacent free list cells in the free list 32, as indicated by the arrows in FIG. 7. Thus, the register mappings for R0–R3, at the third issue point (I3) is P12, P14, P11 and P8, respectively. As described above, the previously mapped physical registers (P4 and P9), are installed in the last name latch, and the pointer is toggled so that the last name becomes the current name.

Figure 7:
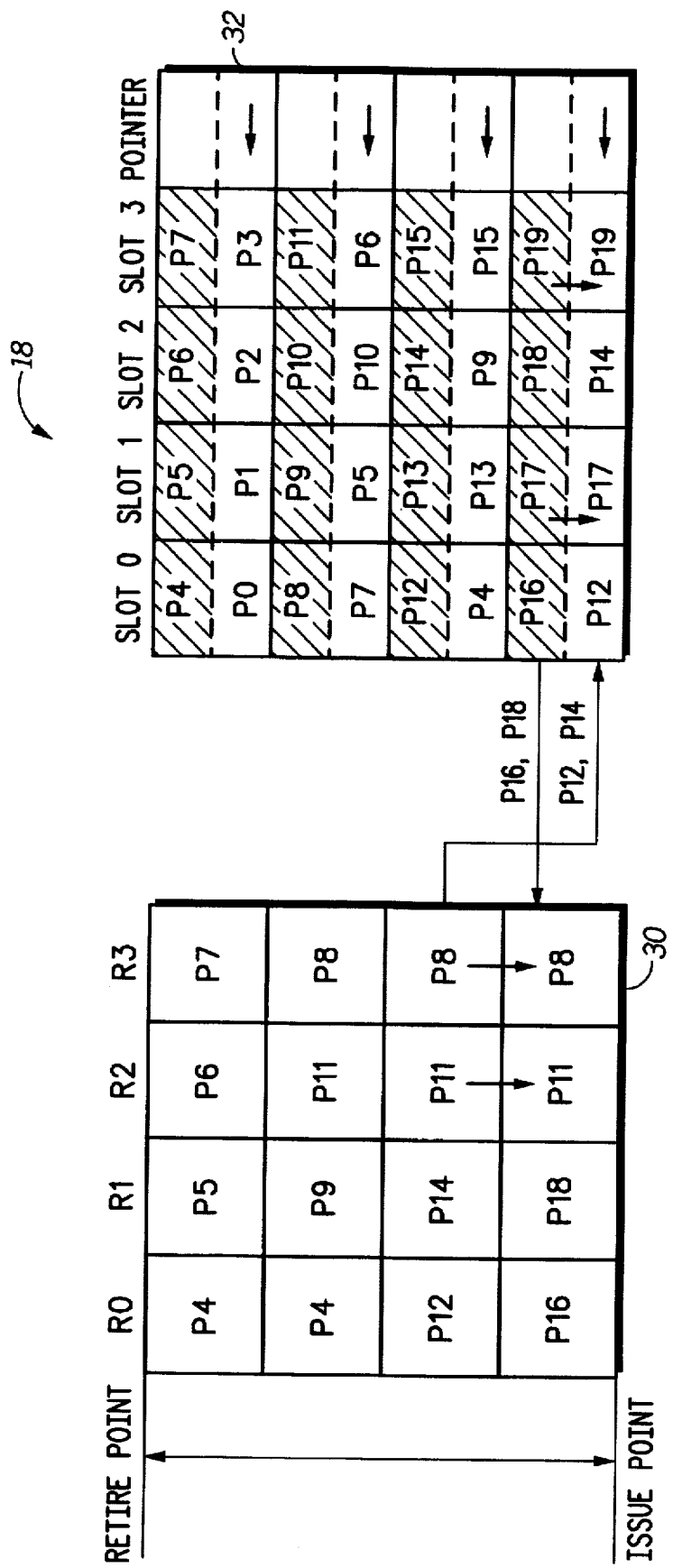

At a fourth issue point (I4) of the register renaming sequence, illustrated in FIG. 7, the instruction decode/issue logic 16 decodes instruction PACKET4 which comprises three ADD instructions, and a NOP instruction as indicated in Table IV below.

TABLE IV

| SLOT0 | ADD (R1 + R2) –> R0 |
|---|---|
| SLOT1 | ADD (R1 + R2) –> R1 |
| SLOT2 | ADD (R1 + R2) –> R1 |
| SLOT3 | NOP |

The first ADD instruction decoded in SLOT0, causes register R0 to be remapped to P16, the free physical register in SLOT0 of the free list 32. The second ADD instruction decoded in SLOT1 causes R1 to be remapped to P17, the free physical register in SLOT1. The third ADD instruction causes R1 to be remapped to P18, the free physical register in SLOT2 of the free list 32. As previously stated, the NOP instruction does not affect the register mapping in the LP map 30. Since the instructions decoded in PACKET3 did not affect the mapping of logical register R2 and R3, their previous physical registers mappings, P11 and P8, respectively, are copied into the adjacent map cells at issue point I4, as illustrated in FIG. 7. Thus, the register mapping for R0–R3, at the fourth issue point is P16, P18, P11, and P8, respectively. The previously mapped physical registers (P12 and P14) are installed in the last name latch of the corresponding free list cell in the free list 32, as indicated by the arrow. The pointer is toggled and the last named physical registers become the current named physical registers.

In accordance with the present invention, eventually during the register renaming sequence, both the LP map 30 and the free list 32 wrap around and overwrite old physical registers names. This does not create a problem so long as the execution units 24 have completed execution of all instructions in the overwritten issue points without any chance of a "back-up" occurring. Accordingly, as illustrated in FIG. 8, at a fifth issued checkpoint (I5), the issuance logic decodes instruction PACKET5 which comprises four ADD instructions indicated in Table V below.

TABLE V

| SLOT0 | ADD (R1 + R2) –> R3 |
|---|---|
| SLOT1 | ADD (R1 + R2) –> R1 |
| SLOT2 | ADD (R1 + R2) –> R0 |
| SLOT3 | ADD (R1 + R2) –> R2 |

Figure 8:
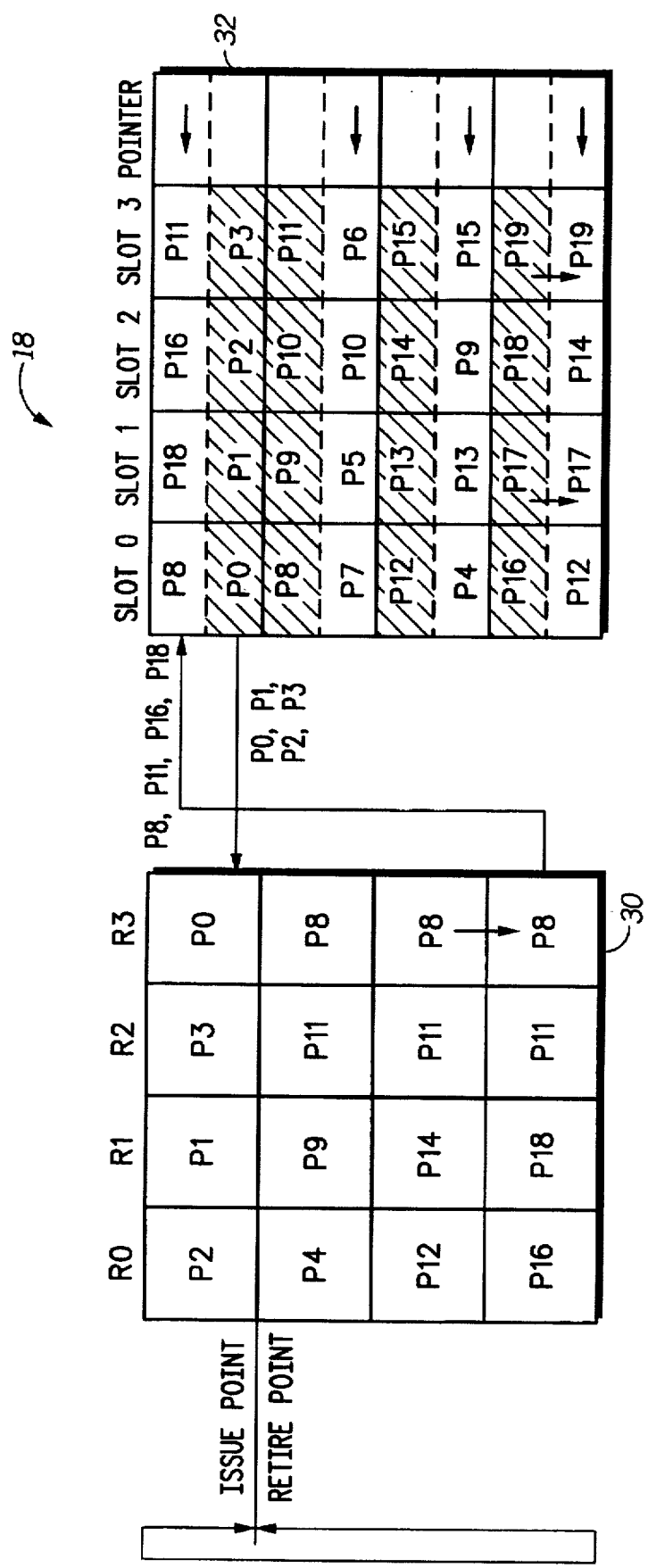
Figure 9:
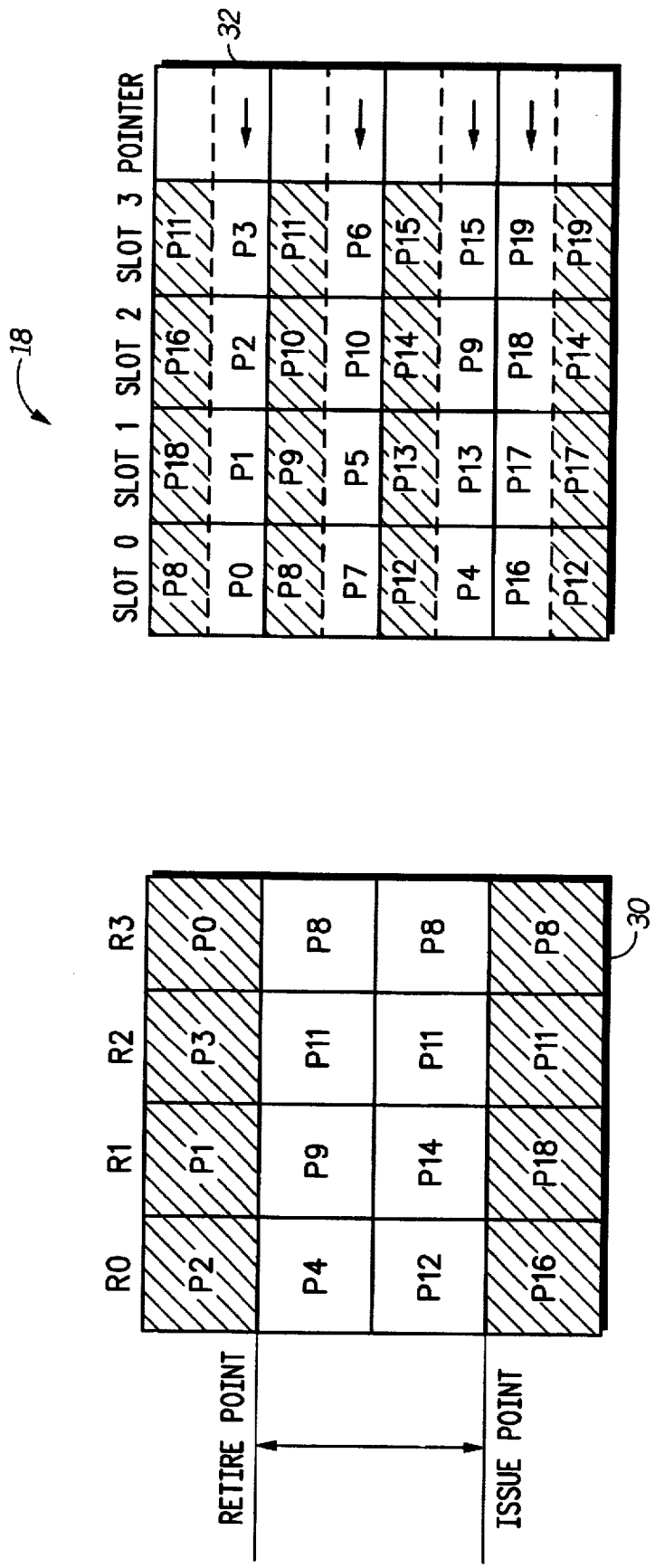

As illustrated in FIG. 8, the free list 32 is wrapping around, therefore, the first available free physical registers are P0–P3. The register mappings (logical-physical) occurring as a result of the issuance of PACKET5 are stored in the LP map 30, as described above. Thus, the register mapping occurring for logical registers R0–R3, at the fifth issue point is P2, P1, P3, and P0, respectively. The previously mapped physical registers (P16, P18, P11, and P8) are installed in the last name latch of the corresponding free list cell in the free list 32, as indicated by the arrow. Once again, the pointer is toggled and the last named physical registers (P8 P18, P16, P11) become the current named physical registers.

When data processing system 10 has a need to restore the state of the sequencer 12 to a previous issue point, as a result of the occurrence of an exception (e.g. interrupt) or due to a branch prediction mistake, a "back-up" operation is performed. As illustrated in FIGS. 3–8, throughout the register renaming operations performed by the data processing system 10, the retire checkpoint (RETIRE POINT) remained in the same place, and the sequencer 12 advanced only the issue points (e.g. I1–I5), upon issuance by the instruction decode/issue logic 16 of each instruction packet. In the present invention, when an exception condition or branch prediction error occurs, the sequencer 12 will provide the register rename hardware 18 with the last good issue point, for example checkpoint I2, and the rename hardware 18 will "back-up", thereby restoring the physical register mappings to those present at issue point I2. Thus, under the control of the sequencer 12, the register rename hardware 18 will move the issue point back to checkpoint I2. Accordingly, the LP map 30 and the free list 32 will move their issue points to issue point I2. In the present invention, the free list 32 will also toggle all of the "current" pointers 80–83 between the last issue point attempted (I6), and the last good issue point (I2). In so doing, the free list 32 restores those physical registers that were free at issue point I2 to the free pool of physical registers. Recalling from FIG. 6, the physical register mapping in LP map 30 for logical registers R0–R3 was P4, P9, P11, P8, respectively. Thus, as illustrated in FIG. 10, the LP map 30, and the free list 32, illustrated in FIG. 10 reflect the same register mappings and free physical registers as those indicated for issue point L2 (FIG. 6).

Figure 10:
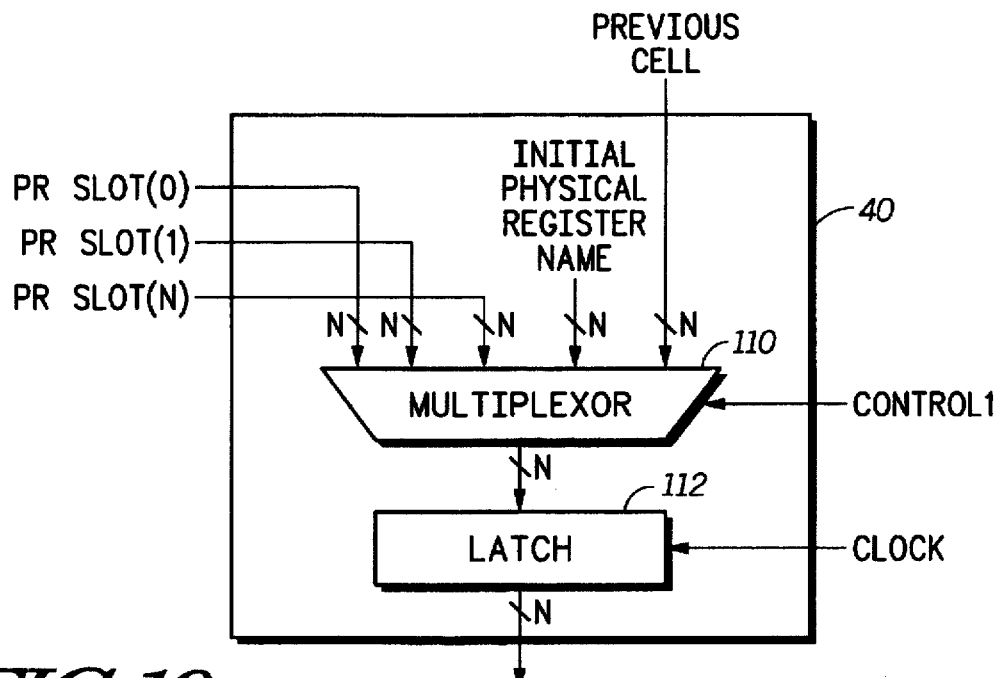
FIG. 10 illustrates in block diagram form a mapping cell of the register mapping logic of FIG. 2, in accordance with the preferred embodiment of the present invention.

FIG. 10 illustrates in block diagram form a map cell 40 of the LP map 30 (FIG. 2). In the preferred embodiment, the LP Map 30 comprises a number of map cells 40–55, each of which has an identical structure as that of map cell 40. As illustrated in FIG. 11, upon initialization an initial physical register name is stored in latch 112, via a multiplexor 110, in response to a first control signal (CONTROL 1) provided by the sequencer 12. Thus, the logical registers R0–R3 are initially mapped to physical registers P0–P3, as previously described. Each time the instruction decode/issue logic 16 decodes an instruction or group of instructions which changes the register allocation for a logical destination register, a physical register name (PR) is retrieved from the free list 32, by SLOT number, and stored in a map cell in the LP map 30. When none of the instructions decoded in a packet (e.g. PACKET2) alter the physical register mapping for a particular logical register number (i.e. R0), the physical register name previously mapped (i.e. P4) to said particular logical register number is transferred into the map cell associated with the issue point (I2) for that instruction packet. Accordingly, the multiplexor 110 will allow either an initial physical register name, a newly mapped physical register from the free list 32, or a physical register name from a previous cell to be stored in the latch 112.

FIG. 11 illustrates in block diagram form a free list cell 60 of the free list 32 (FIG. 2). In the preferred embodiment, the free list 32 comprises a predetermined number of free list cells 60–75, each of which has an identical structure as that of free list cell 60. As illustrated, upon initialization an initial physical register name is store in latch 116, via a multiplexor 114, in response to a second control signal (CONTROL 2) provided by the sequencer 12. Thus, the free physical registers P4–P19 are stored in the free list 32 by instruction slot number, as previously described. Each time an instruction or group of instructions alter the physical register mapping for a logical register, the free list 32 is updated. Accordingly, logical registers that will be written take a physical register name from a free list cell, for example cell 60, and transfer the physical register name to the LP map 30, via the multiplexor 122. The multiplexor 122 places the physical register name and SLOT number (N) on the swap bus 90 (FIG. 2). As previously described, the free list 32 stores for each issue point as many free physical register names as may be written by the group of instructions decoded together (i.e. write-back SLOTS).

Each free list cell 60 contains two physical register names a LAST and a CURRENT, and a pointer (CONTROL 4) which designates which name is CURRENT. In the preferred embodiment, the CONTROL 4 signal is an encoded signal (CONTROL4=CONTROL2/CONTROL3*) the logic state of which is determined by examining the logical states of the control signals for the multiplexors 114 and 118. After each write operation, the register rename hardware 18 exchanges the CURRENT physical register name in the LP map 30, with the free physical register name being mapped (allocated) from the free list 32. Accordingly, the CURRENT physical register name is transferred to the LP map 30 and the physical register name from the LP map 30 is installed in the free list 32 in the place of the LAST name, and a bit in the pointer 80 is toggled so that the LAST becomes the CURRENT. The latch where the LAST name is stored is determined by the state of the CONTROL4 signal provided by the pointer 80. For example, if the CURRENT physical register name (e.g. P4) was stored in latch 116, the CONTROL4 signal would cause the MUX 122 to provide physical register P4 to the LP map 30, via the swap bus 90. The physical register previously allocated to the logical register (e.g. P0) would then be installed in latch 120 (the place of the LAST name), and the pointer 80 would be toggled so that the LAST (latch 120) would become the CURRENT. This process continues for each instruction issue point. Thus, when the sequencer 12 performs a back-up, the register rename hardware 18 may restore the previously free physical registers by toggling the bit in pointer 80, and thereby causing the CONTROL 4 signal to designate P4 as the free physical register, instead of P0.

Figure 12:
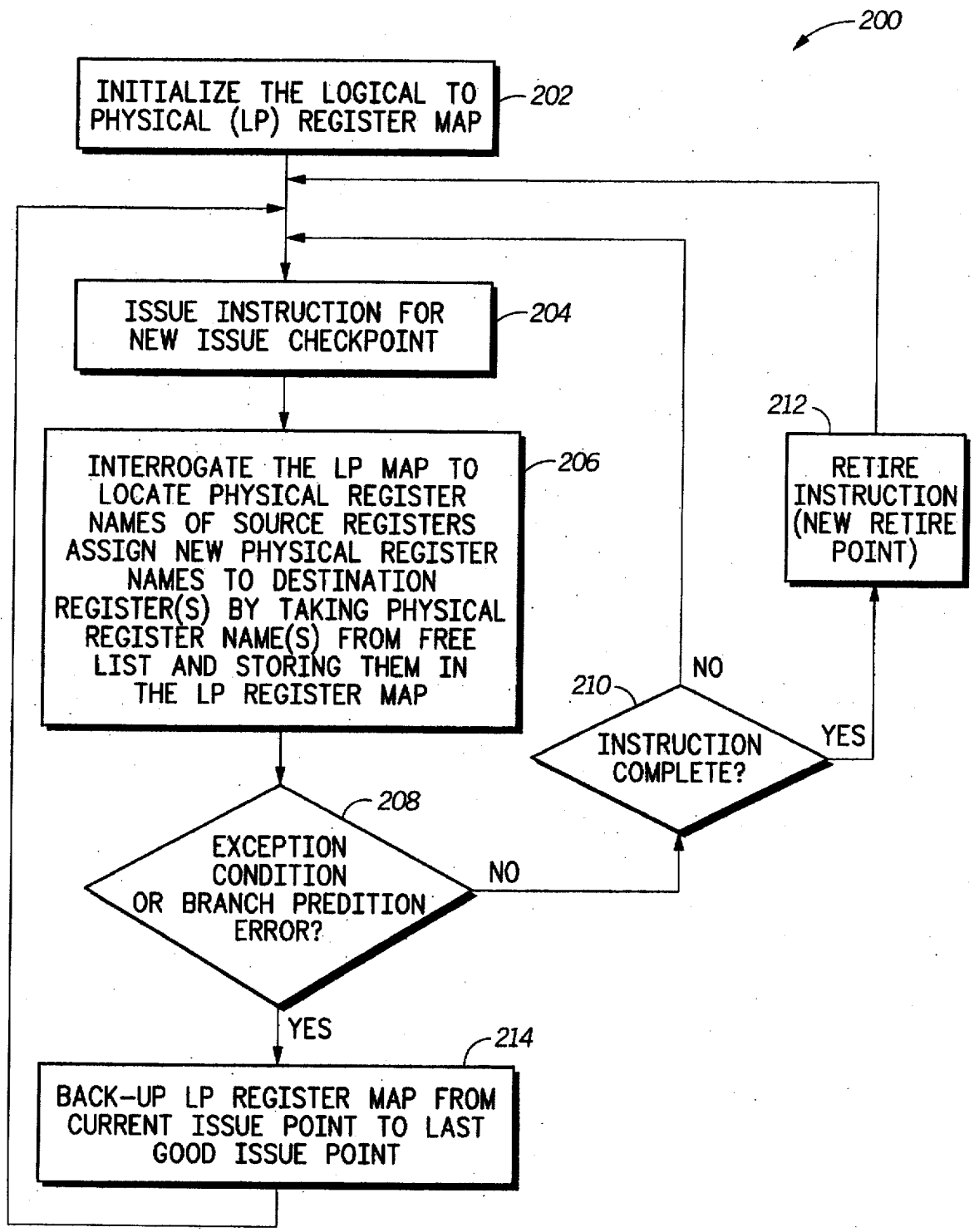
FIG. 12 is a flow chart illustrating the register renaming operation, in accordance with the present invention.

Illustrated in FIG. 12 is a flow diagram 200 for the register renaming sequence with back-up capability, in accordance with the present invention. As illustrated in FIG. 12, at step 202 the sequencer 12 causes the rename hardware 18 to initialize the LP map 30, thereby mapping a first set of physical registers (e.g. P0–P3) to the logical registers R0–R3, as described above. The sequencer 12 provides the rename hardware 18 with an issue point number for each instruction packet decoded by the instruction decode/issue logic 16 at step 204.

During step 206, the rename hardware 18 allows each instruction in the packet to interrogate the LP map 30 to locate the physical register names of source logical registers, and to assign new physical register names to destination logical registers. Accordingly, physical register names for destination logical registers are taken from the physical registers previously assigned to such destination logical registers are removed from the LP map 30 and installed in the free list 32 (as previously described), and therefore become "Invisible". A Visible physical registers becomes Invisible when an instruction writes to the logical register which corresponds to that destination logical registers. Thus, a previously mapped Visible physical register (e.g. P0) becomes Invisible when the rename hardware 18 installs P0 in the instruction slot (e.g. SLOT0), in the free list 32, formerly occupied by the newly allocated register (e.g. P4). The newly allocated register, P4, is then placed in the LP map 30 and becomes Visible.

If an exception condition or branch misprediction occurs, the sequencer 12 will inform the register rename hardware 18 that a "back-up" operation is required, as indicated at step 208. If no "back-up" is required, at step 210 the sequencer will determine whether the execution units 24 have completed execution of any instructions previously decoded. If an instruction or group of instructions have completed execution, the sequencer 12 will issue a new retire point to the register rename hardware 18 at step 212. If no instructions completed, the instruction decode/issue logic 16 will decode a new instruction packet, and the sequencer 12 will issue a new issue point to the register rename hardware 18.

Illustrated in Appendix A, in source code form, is a C model for performing register renaming in accordance with the present invention. The C model of Appendix A maps incoming logical registers (e.g. R0–R3) into physical registers and builds a new entry in a mapping table (LP map 30) for the next issue cycle. Lines 29–32 initialize the next map entry to contain the same mappings as the current issue point and initializes a completion table to "has not completed". This approach is conservative since all of the instructions in the issue packet may be instructions which do not modify the register mappings (e.g. stores, branches). Lines 35–38 allow each instruction to interrogate the LP map 30 and make any required updates to the map for the next issue cycle. Accordingly, lines 39–44 read the physical register name in the current LP map 30 which corresponds to the logical register from the decoded instruction.

Lines 46–51 of the Appendix A update the LP map 30 for the next issue cycle. The update is based on the "completed" variable. The new physical register to be allocated comes from the section of the free list 32 indexed by the completion of the set of instructions which previously used this map entry, in a circular queue manner. Two allocation fields (entries) are maintained; a first entry corresponding to unsuccessful instruction execution and a second entry corresponding to successful execution. The first allocation entry is used if the set of instructions was discarded (when a back-up occurs) by the sequencer 12, the second allocation field is used if the instructions completed execution (when a retirement occurs). Thus, the first allocation entry allows the sequencer 12 to back-up the register mapping and obtain new physical registers to allocate simply by manipulating the issue_point variable. Similarly, if the instruction were executed to completion, the second allocation entry contains the physical registers allocated to use the mapping slot by the previous group of instructions (e.g. PACKET1). Essentially, when the instructions in PACKET1 execute to completion, the "old" physical registers associated with the logical registers in theses instructions can be used for subsequent allocations (mappings). Accordingly, the new destination register(s) allocated on the previous pass now contain the valid register data. Lines 53–57 update the free list 32 for the SLOT(S), in the instruction decode/issue logic 16, for which there was no associated instruction (e.g. a NOP instruction as illustrated in FIG. 7).

Thus, the present invention provides a method for performing register renaming while incorporating the capability to perform a back-up operation to a previous instruction issue point. Although the present invention has been described in accordance with a preferred embodiment, it should be apparent to one of ordinary skill in the art that the invention may be practiced in numerous ways. Accordingly, it is intended by the appended claims to cover all modifications of the invention which fall within the true spirit and scope of the invention.

Appendix A

```
Line 1  # define NUMBER_OF_REGISTERS      (16)
Line 2  # define NUMBER_OF_ISSUES         (6)
Line 3  # define NUMBER_OF_PREDICTIONS    (16)
Line 4  
Line 5  struct Register_Map {unsigned current [NUMBER_OF_REGISTERS],
Line 6                               new [2] [NUMBER_OF_ISSUES],
Line 7                               completed;
Line 8                      } map [NUMBER_OF_PREDICTIONS ];
Line 9  
Line 10      unsigned   issue_point,
Line 11                 retire_point;
Line 12 
Line 13 struct Instruction   { unsigned op_code,
Line 14                                  destination,
Line 15                                  source1,
Line 16                                  source2,
Line 17                                  used_d,
Line 18                                  used_s1,
Line 19                                  used_s2,
Line 20                                  mod_d;
Line 21                      } issue [NUMBER_OF_ISSUES ];
Line 22 
Line 23 void map_registers (struct Instruction * i)
Line 24 {
Line 25      unsigned n,
Line 26            new_issue,
Line 27            completed;
Line 28 
Line 29 new_issue       = (issue_point + 1) % NUMBER_OF_ISSUES;
Line 30 completed       = map [issue_point]. completed;
Line 31 map [new_issue] = map [issue_point];
Line 32 map [new_issue]. completed = FALSE;
Line 33 
Line 34 for (n = 0; n <NUMBER _OF_ISSUES; n++, i++)
Line 35 if (i -> op_code ! = NO_OPERATION )
Line 36 {
Line 37 unsigned destination = i -> destination;
Line 38 
Line 39 if (i -> used_s1)
Line 40   i -> source1     = map [issue_point] . current [i -> source1];
Line 41 if (i -> used_s2)
Line 42   i -> source2     = map [issue_point] . current [i -> source2];
Line 43 if (i -> used_d)
Line 44   i -> destination = map [issue_point] . current destination ];
Line 45 
Line 46 if (i -> mod_d)
Line 47 {
Line 48 map [new_issue] . current [destination]   = map [issue_point].
                                                   new [completed] [n]
Line 49 map [new_issue] . new [0] [n]             = map [issue_point].
                                                   new [completed] [n]
Line 50 map [new_issue] . new [1] [n]             = destination;
Line 51 }
Line 52 }
Line 53 else
Line 54 {
Line 55 map [new_issue] .new [0] [n]   =
Line 56 map [new_issue] . new [1] [n]  = map [issue_point].
                                         new [completed] [n]
Line 57 }
Line 58 }
```

We claim:

1. In a data processing system comprising:

instruction sequencing means for decoding, issuing and routing a packet of instructions;

execution means, coupled to said instruction sequencing means for executing a predetermined number of instructions in said packet of instructions;

register storage means coupled to said execution means for storing a plurality of data operands in a predetermined number of physical registers; and register renaming means, coupled to said register storage means and said instruction sequencing means, having a logical to physical (LP) register map coupled to a free list, via an internal bus, said register renaming means receiving a predetermined number of logical registers numbers and control signals from said instruction sequencing means and for generating a plurality of logical to physical register mappings in response thereto;

a method for maintaining a current set of physical register mappings occurring at each of a plurality of instruction issuance checkpoints, in response to said instruction sequencing means decoding a packet of instructions, said method comprising the steps of:

initializing said LP register map by storing in each of a first set of register map cells and each of a first set of free cells a unique physical register name, and setting a bit in a control latch coupled to each of said free cells to a first logic value;

exchanging, via said internal bus, each unique physical register name in a first group of destination registers, stored in said first set of register map cells, with an allocated physical register name from a first latch in a selected number of free cells, and toggling said bit in said control latch coupled to each of said selected number of free cells, while simultaneously copying each unique physical register name in a first group of source registers, stored in said first set of register map cells, from said first set of register map cells into a second set of register map cells, in response to said sequencing means decoding a first packet of instructions at a first instruction issuance checkpoint;

updating each of said free cells with a new group of destination register names, after a next packet of instructions is issued by said instruction sequencing means at a second instruction issuance checkpoint, by exchanging said new group of destination register names with a newly allocated physical register name from a first latch in each of a newly selected number of free cells, and toggling said bit in said control latch coupled to each of said newly selected number of free cells; and restoring said LP register map to a previous instruction issuance checkpoint designated by said instruction sequencing means by examining a logic state of said control bit of said free cells at a current instruction issuance checkpoint, and searching for a first one of said control bits, for said free cells at said instruction issuance checkpoints issued between said previous instruction issuance checkpoint and said current checkpoint, having a complementary logic state, and toggling each of said control bits between said current instruction issuance checkpoint and said previous instruction issuance checkpoint designated by said instruction sequencing means.

2. The method of claim 1 further comprising the steps of:

determining, via said instruction sequencing means, whether one of more instructions in said first packet of instructions have completed execution; and decoding, via said instruction sequencing means, an instruction retire checkpoint to said register rename means to indicate completion of said one or more instructions in said first packet of instructions.

3. The method of claim 1 wherein said step of exchanging each unique physical register name in a first group of destination registers with an allocated physical register name from a first latch in a selected number of free cells is performed by said register rename means each time said instruction sequencing means issues a new instruction packet which alters a physical register mapping for any one of said predetermined number of logical registers numbers.

4. In a data processing system having instruction sequencing means for decoding a packet of instructions at each of a predetermined number of instruction issuance checkpoints, execution means coupled to said instruction sequencing means for executing instructions issued by said instruction sequencing means, and register renaming means, comprising a logical to physical (LP) map coupled to a free list, via an internal bus, said register renaming means mapping a predetermined number of logical register to a predetermined set of physical registers upon issuance by said instruction sequencing means of each of a plurality of instruction packets, where each instruction packet contains one or more instructions, a method for performing register renaming comprising the steps of:

initializing said LP register map, in said register renaming means, by storing in each of a first set of register map cells in said LP register map, and each of a first set of free cells in said free list, a unique physical register name, and setting a bit in a control latch coupled to each of said free cells to a first logic value;

exchanging each unique physical register name, for a first group of destination registers specified by a first instruction packet issued at a first instruction issuance checkpoint, stored in said first set of register map cells, with an allocated physical register name from a first latch in a selected number of free cells, and toggling said bit in said control latch coupled to each of said selected number of free cells, while simultaneously copying each unique physical register name in a first group of source registers, stored in said first set of register map cells, from said first set of register map cells into a second set of register map cells, in response to said sequencing means decoding said first instruction packet;

updating each of said free cells with a new group of destination register names, after a next instruction packet is issued by said instruction sequencing means at a second instruction issuance checkpoint, by exchanging said new group of destination register names with a newly allocated physical register name from a first latch in each of a newly selected number of free cells, and toggling said bit in said control latch coupled to each of said newly selected number of free cells; and restoring said LP register map to a designated instruction issuance checkpoint designated by said instruction sequencing means by examining a logic state of said control bit of said free cells at a current instruction issuance checkpoint, and searching for a first one of said control bits, for said free cells at said instruction issuance checkpoints issued between said designated instruction issuance checkpoint and said current checkpoint, having a complementary logic state, and toggling each of said control bits between said current instruction issuance checkpoint and said designated instruction issuance checkpoint.

5. The method of claim 4 further comprising the steps of:

determining, via said instruction sequencing means, whether one of more instructions in said first packet of instructions have completed execution; and issuing, via said instruction sequencing means, an instruction retire checkpoint to said register rename means to indicate completion of said one or more instructions in said first packet of instructions.

6. The method of claim 4 wherein said step of exchanging each unique physical register name in a first group of destination registers with an allocated physical register name from a first latch in a selected number of free cells is performed by said register rename means each time said instruction sequencing means issues a new instruction packet which alters a physical register mapping for any one of said predetermined number of logical registers numbers.

7. In a data processing system having instruction sequencing means for decoding a packet of instructions, execution means coupled to said instruction sequencing means for executing instructions issued by said instruction sequencing means, and register renaming means, comprising a logical to physical (LP) map and a free list, for mapping a predetermined number of logical register to a predetermined set of physical registers upon issuance by said instruction sequencing means of said packet of instructions, a method for performing register renaming, said method comprising the steps of:

initializing said LP register map, in said register renaming means, by storing a unique physical register name into each of a first set of register map cells in said LP register map, and each of a first set of free cells in said free list, and setting a bit in a control latch coupled to each of said free cells to a first logic value;

exchanging each unique physical register name in a first group of destination registers, stored in said first set of register map cells, with an allocated physical register name from a first latch in a selected number of free cells, and toggling said bit in said control latch coupled to each of said selected number of free cells, while simultaneously copying each unique physical register name in a first group of source registers, stored in said first set of register map cells, from said first set of register map cells into a second set of register map cells, in response to said sequencing means decoding a first packet of instructions at a first instruction issuance checkpoint;

updating each of said free cells with a new group of destination register names, after a next packet of instructions is issued by said instruction sequencing means at a second instruction issuance checkpoint, by exchanging said new group of destination register names with a newly allocated physical register name from a first latch in a newly selected number of free cells, and toggling said bit in said control latch coupled to each of said newly selected number of free cells;

determining, via said instruction sequencing means, whether one of more instructions in said first packet of instructions have completed execution, and issuing an instruction retire checkpoint to said register rename means to indicate completion of said one or more instructions in said first packet of instructions; and restoring said LP register map to a branch instruction issuance checkpoint by examining a logic state of said control bit of said free cells at a current instruction issuance checkpoint, and searching for a first one of said control bits of a previous instruction issuance checkpoint having a complementary logic state, and toggling each of said control bits between said current instruction issuance checkpoint and said branch instruction issuance checkpoint.

8. The method of claim 7 wherein said step of exchanging each unique physical register name in a first group of destination registers with an allocated physical register name from a first latch in a selected number of free cells is performed by said register rename means each time said instruction sequencing means issues a new instruction packet which alters a physical register mapping for any one of said predetermined number of logical registers numbers.

9. In a data processing system comprising:

instruction sequencing means for decoding, issuing and routing a packet of instructions;

execution means, coupled to said instruction sequencing means for executing a predetermined number of instructions in said packet of instructions;

register storage means coupled to said execution means for storing a plurality of data operands in a predetermined number of physical registers; and register renaming means, coupled to said register storage means and said instruction sequencing means, having a logical to physical (LP) register map coupled to a free list, via an internal bus, said register renaming means receiving a predetermined number of logical registers numbers and control signals from said instruction sequencing means and for generating a plurality of logical to physical register mappings in response thereto;

a method for maintaining a current set of physical register mappings occurring at each of a plurality of instruction issuance checkpoints, in response to said instruction sequencing means decoding a packet of instructions, said method comprising the steps of:

initializing said LP register map by storing in each of a first set of register map cells and each of a first set of free cells a unique physical register name, and setting a bit in a control latch coupled to each of said free cells to a first logic value;

exchanging, via said internal bus, a unique physical register name for a first group of destination registers, stored in a first set of register map cells, with an allocated physical register name stored in a selected number of free cells, and modifying said bit in said control latch coupled to each of said selected number of free cells, while simultaneously copying each unique physical register name in a first group of source registers into a second set of register map cells, in response to said sequencing means decoding a first packet of instructions at a first instruction issuance checkpoint;

updating each of said free cells with a new group of destination register names, after a next packet of instructions is decoded by said instruction sequencing means at a second instruction issuance checkpoint; and restoring said LP register map to a previous instruction issuance checkpoint designated by said instruction sequencing means upon an occurrence of a predefined processing condition.

10. The method of claim 9 further comprising the steps of:

determining, via said instruction sequencing means, whether one of more instructions in said first packet of instructions have completed execution; and decoding, via said instruction sequencing means, an instruction retire checkpoint to said register rename means to indicate completion of said one or more instructions in said first packet of instructions.

11. The method of claim 9 wherein said step of exchanging a unique physical register name for a first group of destination registers, stored in a first set of register map cells, with an allocated physical register name stored in a selected number of free cells is performed by said register rename means each time said instruction sequencing means issues a new instruction packet which alters a physical register mapping for any one of said predetermined number of logical registers numbers.

12. The method of claim 9 wherein said step of restoring said LP register map to said previous instruction sequencing means comprises the steps of:

examining a logic state of said control bit of said free cells at a current instruction issuance checkpoint;

searching for a first one of said control bits, for said free cells at said instruction issuance checkpoints issued between said previous instruction issuance checkpoint and said current checkpoint, having a complementary logic state; and toggling each of said control bits between said current instruction issuance checkpoint and said previous instruction issuance checkpoint designated by said instruction sequencing means as a last valid issuance checkpoint.

13. In a data processing system comprising:

instruction sequencing means for decoding, issuing and routing a packet of instructions;

execution means, coupled to said instruction sequencing means for executing a predetermined number of instructions in said packet of instructions;

register storage means coupled to said execution means for storing a plurality of data operands in a predetermined number of physical registers; and register renaming means, coupled to said register storage means and said instruction sequencing means, having a logical to physical (LP) register map coupled to a free list, via an internal bus, said register renaming means receiving a predetermined number of logical registers numbers and control signals from said instruction sequencing means and for generating a plurality of logical to physical register mappings in response thereto;

a method for maintaining a current set of physical register mappings occurring at each of a plurality of instruction issuance checkpoints, in response to said instruction sequencing means decoding a packet of instructions, said method comprising the steps of:

initializing said LP register map by storing in each of a first set of register map cells and each of a first set of free cells a unique physical register name, and settling a bit in a control latch coupled to each of said free cells to a first logic value;

exchanging, via said internal bus, a unique physical register name for a first group of destination registers, stored in a first set of register map cells, with an allocated physical register name stored in a selected number of free cells, while simultaneously copying each unique physical register name in a first group of source registers into a second set of register map cells, in response to said sequencing means decoding a first packet of instructions at a first instruction issuance checkpoint;

updating each of said free cells with a new group of destination register names, after a next packet of instructions is decoded by said instruction sequencing means at a second instruction issuance checkpoint; and restoring said LP register map to a previous instruction issuance checkpoint designated by said instruction sequencing means as a last valid issuance checkpoint, upon an occurrence of a predefined processing condition.

14. The method of claim 13 further comprising the steps of:

determining, via said instruction sequencing means, whether one of more instructions in said first packet of instructions have completed execution; and decoding, via said instruction sequencing means, an instruction retire checkpoint to said register rename means to indicate completion of said one or more instructions in said first packet of instructions.

15. The method of claim 13 further comprising the step of modifying said bit in said control latch coupled to each of said selected number of free cells, in response to said sequencing means decoding said packet of instruction at each of said plurality of instruction issuance checkpoints.

16. The method of claim 15 wherein said step of restoring said LP register map to said previous instruction issuance checkpoint comprises the steps of:

examining a logic state of said control bit of said free cells at a current instruction issuance checkpoint;

searching for a first one of said control bits, for said free cells at each of said instruction issuance checkpoints issued between said previous instruction issuance checkpoint and said current instruction issuance checkpoint, having a complementary logic state; and toggling each of said control bits between said current instruction issuance checkpoint and said previous instruction issuance checkpoint designated by said instruction sequencing means.

* * * * *

UNITED STATES PATENT AND TRADEMARK OFFICE
CERTIFICATE OF CORRECTION

PATENT NO.     : 5,694,564
DATED          : December 2, 1997
INVENTOR(S)    : Mitchell Alsup et al.

It is certified that error(s) appear in the above-identified patent and that said Letters Patent is hereby corrected as shown below:

In claim 13, column 17, line 30;
    replace "settling" with - - setting- -.

Signed and Sealed this

Twenty-fourth Day of November, 1998

Attest:

BRUCE LEHMAN

Attesting Officer      Commissioner of Patents and Trademarks